Patented Oct. 23, 1928.

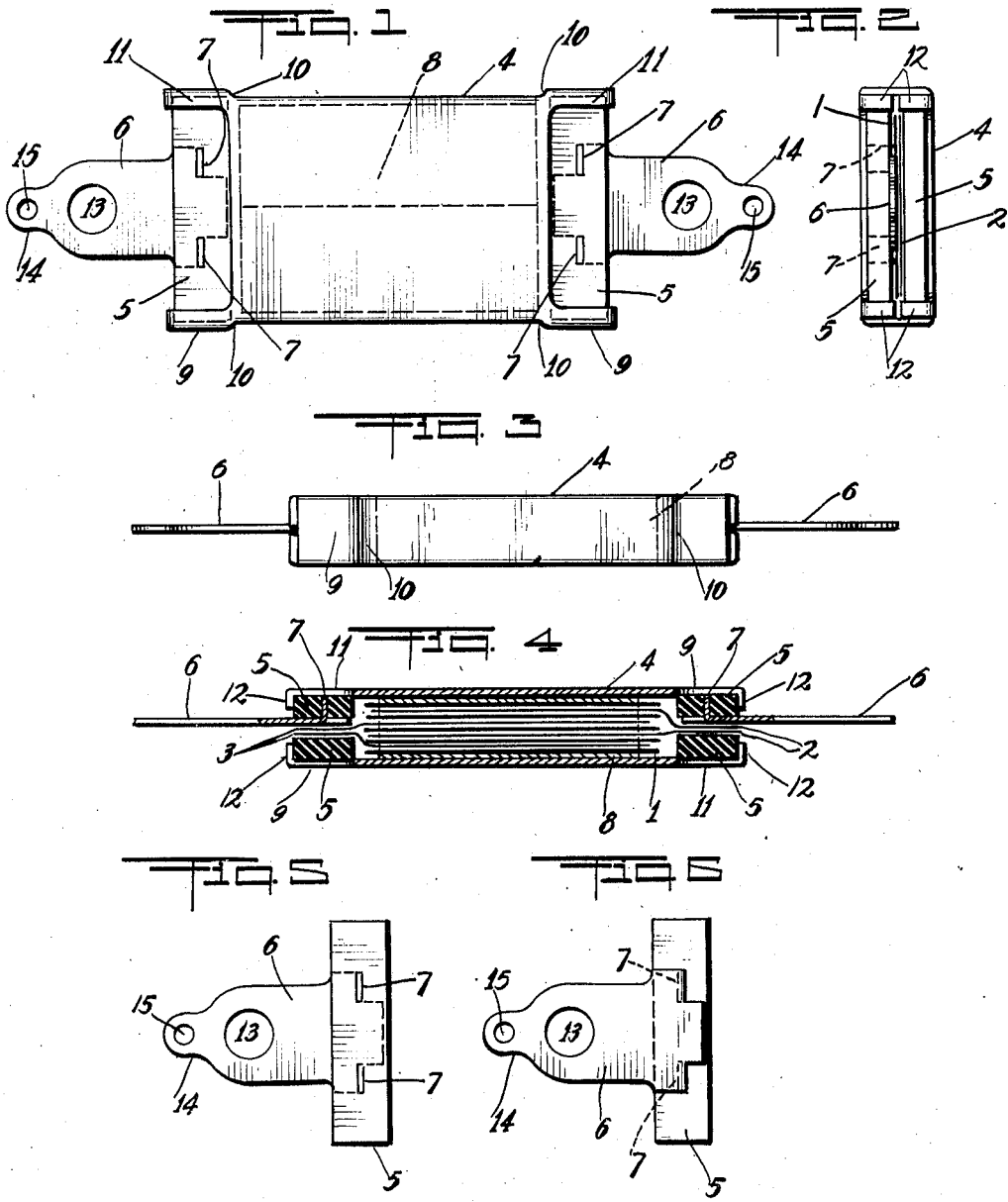

1,688,961

UNITED STATES PATENT OFFICE.

WILLIAM DUBILIER, OF NEW ROCHELLE, NEW YORK, ASSIGNOR TO DUBILIER CONDENSER CORPORATION, OF NEW YORK, N. Y., A CORPORATION OF DELAWARE.

ELECTRICAL CONDENSER.

Application filed November 30, 1925. Serial No. 72,301.

This invention relates to improvements in electrical condensers; especially condensers of constant electrostatic capacity.

An object of the invention is to provide an electrical condenser which is strong and durable, and to that end suitably housed in a protective covering; which is designed to prevent variations of capacity in practice; and which may be provided with convenient terminals to enable it to be connected to a circuit in which it is to operate.

These and other objects and advantages are set forth in the following description, taken with the accompanying drawings, which disclose a preferred form of my invention; but I reserve the right to make changes which are consistent with the principle of the invention and are embraced within the scope of the appended claims.

On the drawings:—

Figure 1 is a plan view of a condenser according to my invention;

Figure 2 is an end view thereof;

Figure 3 is a side view thereof;

Figure 4 is a longitudinal section; and

Figures 5 and 6 are respectively top and bottom views of the members for securing the terminals upon the condenser.

The same numerals identify the same parts throughout.

The condenser is shown as comprising a stack of sheets of insulation, such as mica 1, lying between electrically conductive elements, part of which project from one end of the stack as indicated at 2, and the remainder from the other end of the stack as shown at 3. The stack may be subjected to pressure, and impregnated with wax or some other liquid insulating material to cause the mica sheets and the conductive elements, which may be metallic foil, to make firm contact with each other over substantially their entire area and eliminate air spaces and voids between the mica sheets 1 and the foil sheets 2 and 3; and at the same time, prevent the entrance of moisture into the stack, or the stack may be otherwise treated to secure the desired result. When completely assembled this stack will be housed in a casing 4 which covers the stack and this casing 4 may likewise be compressed if one so desires to make it fit firmly over the outside of the stack. This casing 4 is in the form of a tube or sleeve open at both ends to enable the stack to be inserted into it.

At each end of the stack, I dispose a pair of clamping or gripping members 5 which extend across the stack from one side to the other and grip the projecting ends of the conductive elements 2 and 3 between them. The members 5 may be in the form of pieces of bakelite or other insulation and to the inner face of one of these members 5 at each end of the condenser, is secured a terminal in the form of a tab 6. The construction of the condenser as thus far described, is shown particularly in Figure 4, and the tabs 6 are illustrated in that view, as secured to the lower or inner face of the upper member 5 at each end of the condenser and as resting upon the projecting ends of the elements 2 and 3.

These tabs may be stamped as by cutting and bending portions at their inner ends to provide projections 7 which extend at right angles to the plane of the tabs and enter apertures in the members 5 shown as the upper members in Figure 4, so as to attach the tabs 6 to these upper members, the projections 7 fitting the apertures in the members 5 tightly. Then, when the members 5 are made to grip the projecting ends of the elements 2 and 3 between them, the terminals or tabs 6 make good contact with the conductive elements of the condenser.

When the stack is assembled, it preferably should be encircled by a clamp 8 indicated on Figure 4 in section. This clamp may be a metallic band or plate and it may go entirely around the stack and overlap at its end on one face of the stack, or its two ends may abut or even be separated to some extent provided the clamp is made to grip the stack securely to keep the mica sheets and foil sheets in good contact. As indicated in Figure 1, the ends of the clamp abut each other and when the clamp is put in place around the stack, pressure may be utilized as by subjecting the stack and clamp to a blow from a power press to make the clamp tight. The clamping members 5 can then be attached to the projecting ends of the sheets of foil 2 and 3, so as to grip these projecting ends between them, the upper members 5, as already stated, bearing the terminal tabs 6, so that these tabs make contact with the projecting ends of the foil sheets and then the stack with the members 5 and tabs 6 can be inserted endwise into the casing 4.

This casing has a pair of projections 9 at each end in line with the adjacent sides and the projections may not be flush with the sides, but extend laterally outward to a slight extent as indicated at 10. These projections are channel shaped; that is to say, they have faces which are parallel with the sides of the casing 4 as indicated in Figure 3, and other portions which are parallel with the upper and lower faces of the casing as indicated at 11, particularly on Figure 1; and the portions 11 have their ends extended a little so that these ends can be bent down against the edges of the members 5 as indicated at 12, so as to prevent the clamping members 5 with the terminals 6 from being pulled out of the casing and away from the ends of the stack therein. Hence, when the stack with the clamping members 5 and terminal tabs is disposed in the casing 1, and the ends of the portions 11 are bent down into engagement with the sides or edges of the members 5, the parts of the casing are all held securely together.

The tabs 6 may have apertures 13 therein, and their ends 14 may also have apertures 15 to facilitate the attachment of a conductor to enable the condenser to be connected into circuit.

After the stack is put into the casing, and secured by bending down the ends 12 of the portions 11, the condenser may be further compressed by subjecting the casing to external pressure to make the condenser more compact and solid, and otherwise assist the clamp 8 to prevent the occurrence of slight spaces or voids between the foil sheets and the mica sheets 1.

Figure 4, of course, shows the mica sheets 1 and foil sheets 2 separated more than is actually the case, in order to indicate clearly these parts in end view; but it is, of course, understood that in practice the mica sheets and foil will be in actual contact and compressed closely together; and the casing will be just deep enough from its upper face to its lower, to receive the stack and clamp 8 within it while the combined thickness of the members 5 with the tabs 6 between them will be the same as that of the stack with the clamp around it.

If desired, the combined thickness of the members 5 with the tabs 6 between them, may be of a thickness different from that of the clamp or casing 4.

This type of condenser by the use of the metal clamp 4 enables the amount of insulation outside of the stack, comprising the sheets of mica 1, and the sheets of foil, to be reduced to a minimum.

Having described my invention, what I believe to be new and desire to secure and protect by Letters Patent of the United States is:

1. A condenser including electrically conductive elements projecting therefrom, a clamp for said elements, a terminal in contact with said elements, and insulating clamping members gripping said elements and said terminal between them, and a casing for said elements and said clamp.

2. A condenser including electrically conductive elements projecting therefrom, a clamp for said elements, a terminal engaging said elements, insulating members gripping said elements and said terminal, and a casing for said elements and clamp and having portions for securing said members in place.

3. A condenser including a casing having a pair of projections at each end in line with the adjacent sides, each projection having portions bent against the adjacent ends of the condenser.

4. A condenser comprising electrically conductive elements insulated from each other, part of said elements projecting from one end of the condenser and part from the other, a terminal to engage the elements projecting at each end of the condenser, insulating clamping members to grip said terminals, and a casing enclosing said elements, the casing having projections at each end in line with the sides, to extend across the clamping members, and with portions at each end of said sides to be bent against said members to secure same against displacement.

5. A condenser including electrically conductive elements, a clamp for said elements, a terminal in contact with said elements, a covering for said elements and said clamp, an insulating member within the covering, and a projection on the terminal to engage said insulating member.

In testimony whereof I affix my signature.

WILLIAM DUBILIER.